United States Patent [19]

Hiwatashi et al.

[11] Patent Number: 4,934,731
[45] Date of Patent: Jun. 19, 1990

[54] CONTROL DEVICE FOR AN ACTIVE FLUID SUSPENSION SYSTEM OF MOTOR VEHICLES

[75] Inventors: Yutaka Hiwatashi; Katsuyoshi Kamimura; Atsushi Mine, all of Tokyo, Japan

[73] Assignee: Fuji Jukogyo Kabushiki Kaisha, Tokyo, Japan

[21] Appl. No.: 363,079

[22] Filed: Jun. 8, 1989

[30] Foreign Application Priority Data

Jun. 16, 1988 [JP] Japan ................................ 63-148730

[51] Int. Cl.$^5$ ........................ B60G 11/30; B60G 17/04
[52] U.S. Cl. .................................... 280/698; 280/707; 280/711
[58] Field of Search ............... 280/693, 698, 704, 707, 280/709, 711, 714

[56] References Cited

U.S. PATENT DOCUMENTS 4,655,440  4/1987  Eckert .................................. 280/714
4,765,648  8/1988  Mander et al. ....................... 280/714

FOREIGN PATENT DOCUMENTS 220658  5/1987  European Pat. Off. ............ 280/707
49508   5/1988  Japan .................................. 280/707

Primary Examiner—Charles A. Marmor
Assistant Examiner—Tamara L. Finlay
Attorney, Agent, or Firm—Beveridge, DeGrandi & Weilacher

[57] ABSTRACT

An active fluid suspension system has a controller for controlling the delivery and withdrawal of air to and from individual suspension units at vehicle wheels in response to the sensor output signals representing a prescribed set of vehicle behaviors. The controller includes insensitivity zone filters each for filtering out those portions of one sensor output signal of which amplitudes are within an insensitivity zone, thereby avoiding unnecessary fluid flow into and out of the suspension units. The insensitivity zone is defined as a range of amplitudes between given positive and negative values. The filters widen the insensitivity zones with an increase in vehicle speed for optimum suspension control in all vehicle speed ranges.

2 Claims, 3 Drawing Sheets

CONTROL DEVICE FOR AN ACTIVE FLUID SUSPENSION SYSTEM OF MOTOR VEHICLES

BACKGROUND OF THE INVENTION

The present invention relates generally to suspension systems for motor vehicles, and more particularly to an active fluid suspension system. Still more particularly, the invention deals with an improved device for controlling the active fluid suspension system for optimum performance characteristics at various vehicle speeds.

The active fluid suspension system has been known and used, which comprises a set of fluid suspension units disposed one at each vehicle wheel. Air or other fluid is introduced into and withdrawn from the suspension units under the control of an electronic controller in response to the output signals of sensors which detect a prescribed set of vehicle behaviors. Therefore, the suspension units function for leveling the vehicle, for the absorption of shocks and vibrations, and for other purposes. The active fluid suspension system contributes to the enhancement of the ride under all traveling conditions of the vehicle.

The pending Japanese Patent Application No. 62-107992, filed by the present applicant, discloses an improved active fluid suspension system. It suggests the use of what are termed "insensitivity zone filters" within the controller. These filters are intended to provide "insensitivity zones", such that the controller does not respond to those portions of the sensor output waveforms whose amplitudes are between given positive and negative values. The insensitivity zone filters serve to preclude unnecessary fluid flow into and out of the suspension units in response to the sensor output signal portions of negligibly small amplitudes. Thus the filters appreciably reduce the energy required for fluid flow and, at the same time, makes possible the more positive control of the suspension units.

However, this pending application has a weak point. If the insensitivity zones are determined for optimum suspension control in a low vehicle speed range, energy of vibrations which the vehicle receives from the road increases in proportion to the square of the vehicle speed. Consequently, at high vehicle speed, the sensor output signals become so great in amplitude that they mostly pass the insensitivity zone filters unsuppressed. The result is a drastic increase in the amounts of the fluid that must be unnecessarily forced into and withdrawn from the suspension units, running counter to the objective of economy in the energy used for such fluid flow.

It would provide no solution to this problem to determine the insensitivity zones so as to suit the higher vehicle speed range. For, in that case, the controller would fail to make the necessary control of the suspension units in the lower vehicle speed range.

SUMMARY OF THE INVENTION

The present invention defeats the noted weakness of the prior application by making the insensitivity zone variable with vehicle speed for optimum control of the active fluid suspension system at all vehicle speeds.

Briefly, the invention is featured by a speed-responsive active fluid suspension system comprising a set of fluid suspension units disposed one at each wheel of a motor vehicle. Control valve means control the delivery and withdrawal of fluid to and from the individual suspension units under the direction of control means responsive to sensor output signals representative of a prescribed set of vehicle behaviors. The control means include insensitivity zone filter means for attenuating those portions of each sensor output signal whose amplitudes fall within an insensitivity zone which is defined as a range of amplitudes between given positive and negative values. A vehicle speed sensor is connected to the insensitivity zone filter means to enable the latter to widen the insensitivity zones with an increase in vehicle speed.

Thus, according to the invention, the insensitivity zones are at a minimum in the low vehicle speed range in which the vehicle receives relatively small vibratory energy from the road. The suspension system responds to such small vibratory energy for the fulfillment of its intended functions. The insensitivity zones automatically become broader as the vehicle picks up speed, resulting in a corresponding increase in the vibratory energy from the road. The broader insensitivity zones serve to reduce the energy and the amount of the fluid used but, nevertheless, to enables the suspension system to operate in a manner suiting the high vehicle speed. All in all, with the insensitivity zones varied in breadth with the vehicle speed according to the invention, it becomes possible to make proper control of the active suspension system, and to minimize the energy required for fluid flow into and out of the suspension units, at all vehicle speeds.

The other objects and features of this invention will become understood from the following description with reference to the accompanying drawings.

DESCRIPTION OF THE PREFERRED EMBODIMENT

Figure 1:
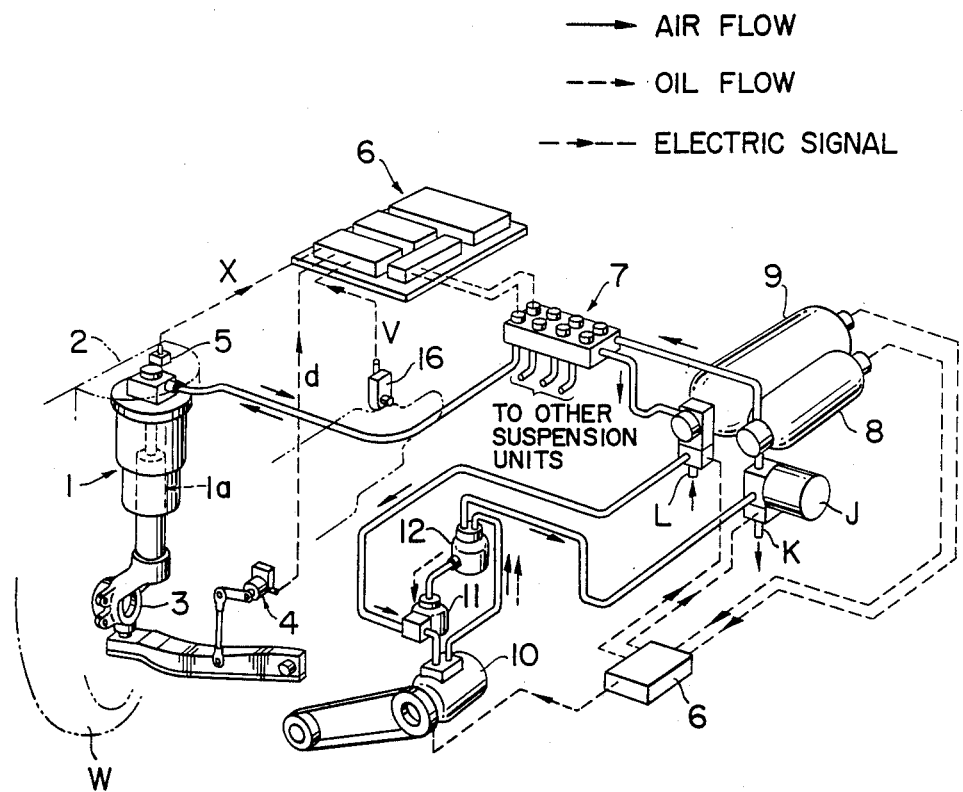
FIG. 1 is a partial diagrammatic perspective view showing the primary components, as well as their interconnections, of the active air suspension system embodying the principles of the present invention, the view showing but one suspension unit with the understanding that the other suspension units are alike both in construction and in the method of control.

The present invention will now be described more specifically as adapted for controlling an air suspension system. FIG. 1 shows an active air suspension system only for one representative vehicle wheel W. The system includes an air suspension unit 1 connected between a frame member 2 and an axle support member 3 at each wheel W. The air suspension unit 1 is provided with a high-frequency damper 1a. This damper comprises a cylinder having a bottom end connected to the axle support member 3 with a piston rod extending upwardly therefrom and coupled to the frame member 2 via elastic means. The cylinder contains an air chamber.

The high-frequency damper 1a has a low damping factor to attenuate a higher-frequency component (e.g.

more than four to five hertz) of the vertical oscillation of the vehicle wheel W. The air contained in the air chamber bears, by its inherent elasticity, the sprung weight of the vehicle in cooperation with the air in the air chambers of the other suspension units. The amount of air in the air chamber controllably varies to change the vehicle height (i.e. a vertical distance between the frame member 2 and the wheel axle), as well as the spring constant and damping rate of the suspension unit 1.

A relative displacement sensor 4 (hereinafter referred to as the displacement sensor) provides an electric signal representing a relative displacement of a sprung part and unsprung part of the vehicle. A vertical acceleration sensor 5 (hereinafter referred to as the acceleration sensor) is also provided for providing an acceleration signal representing the vertical acceleration of the sprung part of the vehicle.

The displacement sensor 4 and the acceleration sensor 5 are provided at the other vehicle wheels, too. The output signals of the sensors 4, 5 are input to a controller 6.

Next to the controller 6, a control valve assembly 7 is provided and comprises four pairs of a delivery valve and an exhaust valve for each suspension unit 1. Thus the control valve assembly 7 independently controls the delivery of pressurized air into, and the withdrawal of the air from, the air chambers of the suspension units at the four vehicle wheels W.

The control valve assembly 7 has a supply air accumulator 8 and an exhaust air accumulator 9 in and out of communication with the suspension unit 1. Pressurized air is delivered from the supply air accumulator 8 to the suspension unit 1 when the delivery valve of the control valve assembly 7 opens. The air pressure within the supply air accumulator 8 is set sufficiently higher than that of the air chamber in the suspension unit 1 for immediate delivery of the pressurized air to the latter when the delivery valve of the control valve assembly 7 opens. The air in the air chamber of the suspension unit 1 is exhausted and directed into the exhaust air accumulator 9 when the exhaust valve of the control valve assembly 7 opens. The air pressure within the exhaust air accumulator 9 is set sufficiently lower than the pressurized air in the air chamber in the suspension unit 1 for immediate withdrawal of the air from the latter when the exhaust valve opens. The air thus recovered from the suspension unit 1 to the exhaust air accumulator 9 is recirculated by a compressor 10 and supplied into the supply air accumulator 8. The compressor 10 is driven by an engine of the motor vehicle.

Preferably, the air accumulators 8 and 9 have built-in pressure sensors in order to automatically maintain internal pressures within the preset ranges. The compressor 10 is set into operation when the pressure within the exhaust air accumulator 9 builds up more than an upper limit of the prescribed range. The compressor 10 will draw air from the exhaust air accumulator 9, re-pressurize the air, and introduce the pressurized air into the supply air accumulator 8. The operation of the compressor 10 stops when the pressure within the exhaust air accumulator 9 drops below the upper limit of the prescribed range.

When the pressure within the supply air accumulator 8 drops below the lower limit of the predetermined range, on the other hand, the compressor 10 operates to supply air under pressure from the exhaust air accumulator 9 to the supply air accumulator 8. The compressor 10 stops operation when the pressure within the supply air accumulator 8 builds up to the upper limit of the preassigned range.

Normally, a net balance exists between the amounts of air forced into the four suspension units 1 and those recovered therefrom. Two check valves K and L connected respectively to the supply and exhaust lines are held closed under such normal working conditions to provide a closed pneumatic circuit. The exhaust line check valve L opens when the pressure within the exhaust air accumulator 9 drops to the lower limit of the prescribed range during air supply to the supply air accumulator 8, or when air is initially supplied into the pneumatic circuit. Drawn into the pneumatic circuit through the check valve L, atmospheric air is charged into the supply air accumulator 9 via an air drier J.

The compressor 10 operates to draw air from the exhaust air accumulator 9 for delivery to the supply air accumulator 8 when the pressure in the exhaust air accumulator 9 becomes too high. During such operation of the compressor 10, the pressure within the supply air accumulator 8 reaches the upper limit of the prescribed range. Then the supply line check valve K opens for discharging the pressurized air from the compressor 10 to the atmosphere. A suitable silencer, not shown, may be provided for the reduction of the noise that might be generated during such discharging of the pressurized air.

FIG. 1 also shows a lubricating oil reservoir 11 connected upstream of the air compressor 10, and an oil separator 12 connected on its downstream side. The oil mixed with air lubricates the compressor. The oil separator 12 separates oil from the mixture of oil and pressurized air from the compressor 10 and the oil returns to the reservoir 11. If the compressor in use is of the type that needs no lubrication, the oil reservoir 11 and oil separator 12 are both unnecessary.

Incidentally, if the compressor 10 is driven by the unshown vehicle engine, an electromagnetic clutch or equivalent device may be connected therebetween for on/off control of the compressor. The compressor may, of course, be driven by an electric motor or the like instead of by the vehicle engine.

Figure 2:
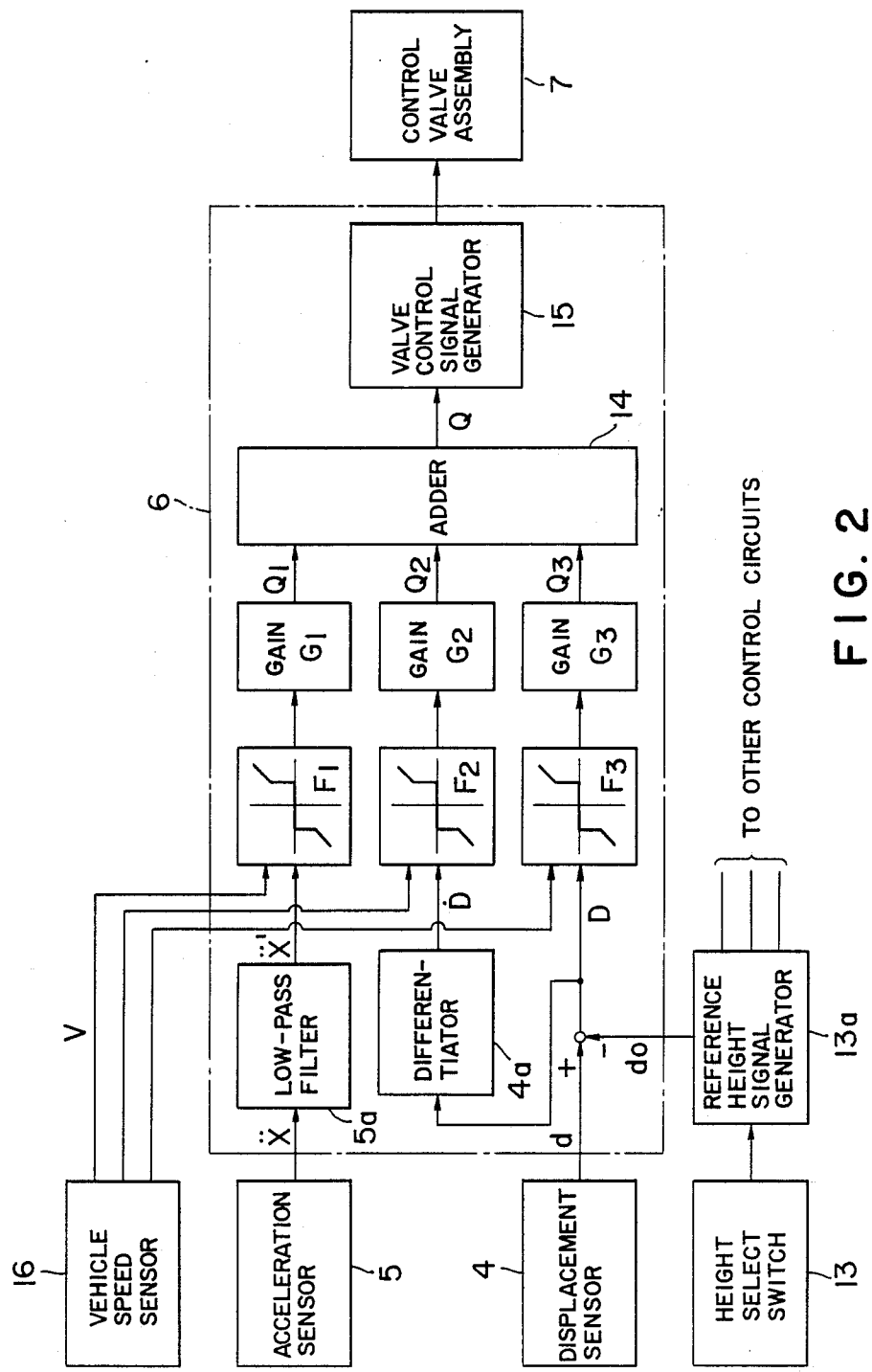
FIG. 2 is a block diagram of an example of control circuit in the controller of the suspension system of FIG. 1 for each suspension unit.

FIG. 2 shows a circuit (within a dotted-and-dashed outline) of the controller 6 for each suspension unit 1. Since the motor vehicle has four suspension units at the respective wheels, the controller 6 has three other control circuits of each suspension unit.

Each control circuit comprises a low-pass filter $5a$, a differentiator circuit $4a$, three insensitivity zone filter circuits $F_1$, $F_2$ and $F_3$, three gain or amplifier circuits $G_1$, $G_2$ and $G_3$, an adder circuit 14, and a valve control signal generator circuit 15. The last circuit 15 is electrically connected to the control valve assembly 7 for controlling the delivery valve and exhaust valve.

Also shown in FIG. 2 are the displacement sensor 4 and the acceleration sensor 5, which are both provided for each suspension unit. Additionally, there are provided a vehicle height select switch 13, a reference vehicle height signal generator circuit $13a$, and a vehicle speed sensor 16, which are all common to the four suspension units. As a vehicle operator actuates the vehicle height select switch 13 to select a desired vehicle height, the generator circuit $13a$ outputs a reference height signal $d_o$ representing the desired vehicle height. Each control circuit independently controls the associated suspension unit 1 in response to the output signals of the displacement sensor 4, the acceleration sensor 5, the reference vehicle height signal generator circuit 13a, and the vehicle speed sensor 16. The following is a more detailed discussion that each control circuit controls the associated suspension unit in response to all input signals.

The acceleration sensor 5 generates an acceleration signal $\ddot{X}$ representing the vertical acceleration of the vehicle. This acceleration signal is first input to the low-pass filter 5a, which transmits only its frequency band below a given cutoff frequency. The filtered acceleration signal $\ddot{X}$ subsequently enters into the first insensitivity zone filter circuit $F_1$, which removes a portion of the filtered acceleration signal within a first predetermined insensitivity zone. The first amplifier circuit $G_1$ subsequently amplifies an output of the first insensitivity zone filter circuit $F_1$ and outputs a signal $Q_1$ indicating a desired amount of air to be introduced into or withdrawn from the suspension unit 1.

The displacement sensor 4 supplies a displacement signal d indicating the relative vertical displacement between the wheel and the vehicle body. At the controller 6 a reference vehicle height signal $d_o$ from its generator circuit 13a is first subtracted from the displacement signal d. The result is an actual displacement signal D indicating the actual displacement of the vehicle body with respect to the reference vehicle height that has been chosen by the switching the vehicle height select switch 13.

The actual displacement signal D is fed, on one hand, directly to the third insensitivity zone filter circuit $F_3$. On the other hand, the actual displacement signal D is directed to the differentiator circuit 4a to provide an actual displacement velocity signal $\dot{D}$. Nearly zero values of the actual displacement signal D and this actual displacement velocity signal $\dot{D}$ are cut by the second and the third insensitivity zone filter circuit $F_2$ and $F_3$.

The second and third amplifier circuits $G_2$ and $G_3$ subsequently amplify the outputs of the insensitivity zone filter circuits $F_2$ and $F_3$ to provide signals $Q_2$ and $Q_3$ indicating the desired amounts of air to be introduced into or withdrawn from the suspension unit 1.

The vehicle height select switch 13 offers the choice of the vehicle height between, for example, "Normal" and "High". Upon actuation of the vehicle height select switch to the "High" position, a prescribed amount of air is fed under pressure into each suspension unit 1. The vehicle body is thus raised up from the wheel. The raised position of the vehicle represents the reference height. A prescribed amount of air is withdrawn from each suspension unit when the vehicle height select switch 13 is actuated to the "Normal" position. The vehicle body lowers with the consequent contraction of the suspension units. This lowered position of the vehicle body represents the reference height when the vehicle height select switch 13 is in the "Normal" position.

When the vehicle height select switch 13 is in the "Normal" position, the displacement sensor 4 detects the displacement of the vehicle body from the "Normal" position. After that the vehicle height select switch 13 is actuated to the "High" position. Then the difference between the "Normal" and "High" positions is subtracted from the displacement of the vehicle body as detected by the displacement sensor 4. The resulting value represents the actual displacement of the vehicle body with respect to the "High" position.

Some vehicles are not equipped with a height control. On such vehicles the actual displacement signal D is equivalent to the displacement signal d output by the displacement sensor 4. This output signal of the displacement sensor 4 is therefore transmitted directly both to the differentiator circuit 4a and to the third insensitivity zone filter circuit $F_3$.

The signals $Q_1$, $Q_2$ and $Q_3$ supplied to the adder circuit 14 are thereby added together to provide a signal Q representing the net desired amount of air to be introduced into or withdrawn from the associated suspension unit 1. This signal Q is transmitted to the valve control signal generator circuit 15. In response to this input signal the circuit 15 opens the required delivery valve or exhaust valve of the control valve assembly 7 for a length of time needed for the introduction or withdrawal of the required amount of air into or from the suspension unit 1.

The three different signals $\ddot{X}$, $\dot{D}$ and D used for controlling the suspension unit 1 as stated above have distinctly different functions. The acceleration signal $\ddot{X}$ serves to alter the apparent damping characteristic of the suspension unit tending to stop the vertical oscillations of the vehicle body. The actual displacement velocity signal $\dot{D}$ is effective to vary the apparent spring characteristic of the suspension unit. The actual displacement signal $\dot{D}$ eliminates the displacement of the vehicle body from the preselected reference position.

Basically, therefore, air is withdrawn from each suspension unit when the vehicle body is accelerated upwardly. And air is forced into each suspension unit when the vehicle body is accelerated downwardly. Thus each suspension unit 1 becomes soft, when the associated vehicle wheel encounters a bump on the road, thereby cushioning the vehicle body from the shock. However, in the event of damping the load position as a result of a sharp vehicle turn or a rapid acceleration or deceleration, the suspension units increase in apparent rigidity to reduce rolling or pitching of the vehicle to a minimum.

The relative displacement between the wheel and the vehicle body at each suspension unit is also readily controllable. Air is withdrawn from each suspension unit for the relative displacement tending to extend the suspension unit, and air is forced into each suspension unit for the relative displacement tending to retract the suspension unit. The wheel and the vehicle body will thus return to the preselected relative positions.

It is important that the acceleration signal $\ddot{X}$ from the acceleration sensor 5 passes through the low-pass filter 5a in the controller 6. The higher frequency component of the acceleration signal $\ddot{X}$ has high amplitude. Therefore, should the acceleration signal $\ddot{X}$ be passed unfiltered, the suspension unit 1 would demand large amount of pressurized air. A high-power large-size compressor would be needed to meet the demand. Such a compressor necessitates cost and consumption of an extra amount of energy.

Therefore, the low-pass filter 5a serves to suppress the undesired higher frequency component of the output signal of the acceleration sensor 5. The amount of airflow necessary for suspension control is thus reduced significantly. An additional reduction in the amount of airflow is achieved by incorporating the damper 1a of a low damping factor with the suspension unit 1. Comfortable feeling thus realized without any excessive softness.

The insensitivity zone filter circuits $F_1$, $F_2$ and $F_3$ provide insensitivity zones in which the control system does not respond to the sensor output signals or to their modifications formed within the controller 6. Each such insensitivity zone encompass the positive and negative values of the associated signal which are close to zero. The insensitivity zone filter circuits $F_1$, $F_2$ and $F_3$ reduce those amplitude values of the incoming signals $\ddot{X}$, $\dot{D}$ and D to zero which fall within the prescribed insensitivity zones. The filtering-out of such negligible excursions of the sensor signals results in a further reduction of the amounts of airflow into and out of the suspension units, and in more stable, hunting-free operation of the control system.

However, the insensitivity zones are variable in dependency on the vehicle speed. Thus, according to the present invention, the vehicle speed sensor 16 is connected to the individual insensitivity zone filter circuits $F_1$, $F_2$ and $F_3$ for supplying thereto the vehicle speed signal V. A logic circuitry is incorporated in the insensitivity zone filter circuits for automatically varying the range of the insensitivity zones with the vehicle speed changing.

Figure 3A:
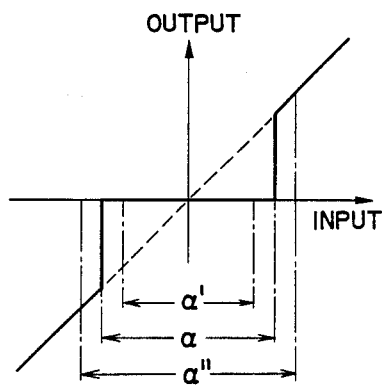
FIGS. 3A and 3B are graphic representations of examples of input/output characteristics of the insensitivity zone filters included in the control circuit of FIG. 2.
Figure 3B:
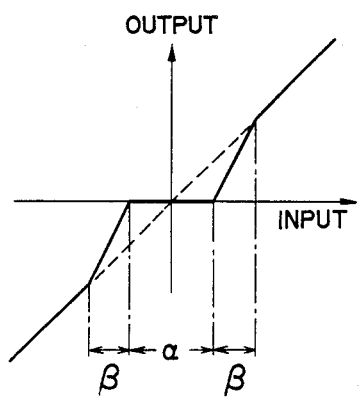

FIGS. 3A and 3B show the insensitivity zone in more detail. The insensitivity zone is designated $\alpha$ in these figures. It will be seen that the insensitivity zone has its opposite extremities either sharply bounded as in FIG. 3A, or loosely as in FIG. 3B, with a pair of "buffer" zones $\beta$ in which the filter output gradually drops to zero. While a variety of other forms may be contemplated, the provision of fixed insensitivity zones is undesirable for the following reasons.

The energy of vibrations given to the motor vehicle from the road is relatively small while the vehicle is traveling in the low speed range. The insensitivity zones has small width u for optimum control of the active suspension system in the low speed range. However, picking up speed, the vehicle receives vibrations of which energy increases as the square of the vehicle speed. The amounts of air for suspension control increases sharply in the high speed range if the insensitivity zones are determined for optimum performance characteristics of the suspension system in the low speed range. The compressor in use would have to be of large, high-power construction to meet the demands of the suspension units. Also, the control system would not easily settle to its normal state.

It might be contemplated to determine the width of the insensitivity zones to suit an intermediate speed range. This solution is unsatisfactory, because the amounts of airflow can not be sufficiently reduced in the high speed range. In the low speed range, too, the control system would fail to perform its intended functions to the full.

From the foregoing considerations the present invention proposes to make the insensitivity zones of the insensitivity zone filter circuits $F_1$, $F_2$ and $F_3$ larger with the vehicle speed increasing. Selective use of such different insensitivity zones makes possible a remarkable reduction of the energy needed for airflow into and out of the suspension units, and optimum suspension control, in all vehicle speed ranges.

Figure 4:
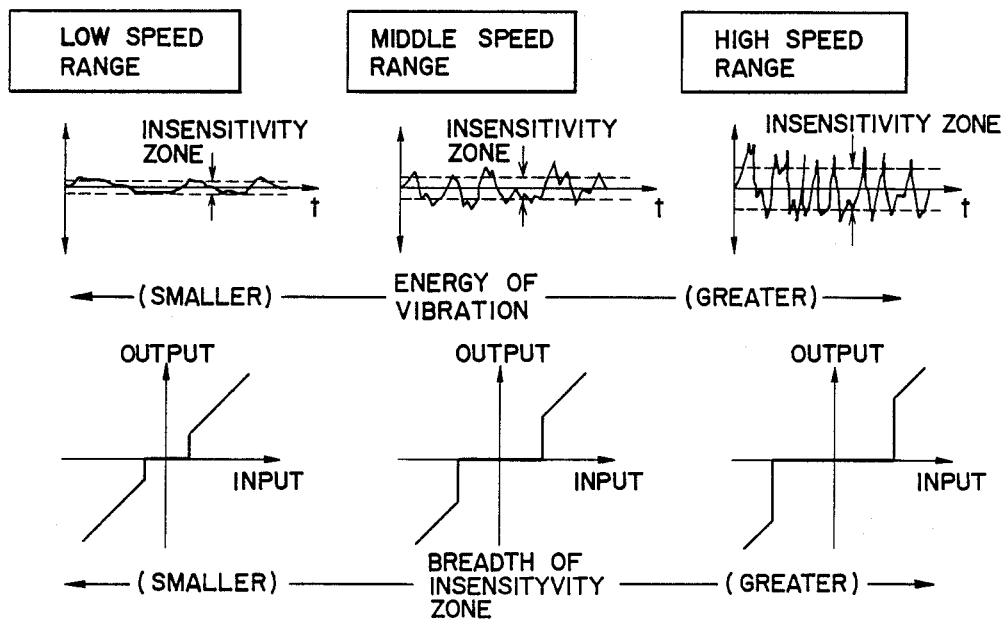
FIG. 4 is a diagram explanatory of how the insensitivity zones of the insensitivity zone filters are varied in breadth with vehicle speed.

FIG. 4 is an illustration of one possible mode of incrementing each insensitivity zone with the vehicle speed increasing. The insensitivity zone is of a minimum width, designated $\alpha$ in FIG. 3A, in the low speed range of the vehicle, of an intermediate breadth $\alpha'$ in the intermediate speed range, and of a maximum breadth $\alpha''$ in the high speed range. The insensitivity zone filter circuits $F_1$, $F_2$ and $F_3$ permit the passage therethrough of only those parts of the input signals of which amplitudes fall outside the insensitivity zones in each speed range, as indicated by a black portion in FIG. 4.

Broadly speaking, however, only two, or more than three, different insensitivity zones may be prepared for as many different vehicle speed ranges in accordance with the invention. A plurality of such different insensitivity zones may be preset in the controller 6. As the vehicle speed sensor 16 supplies the vehicle speed signal V, the logic circuit in the controller 6 chooses one of the insensitivity zones for the current speed range of the vehicle for each insensitivity zone filter circuit, $F_1$, $F_2$ or $F_3$.

It is understood that the foregoing disclosure is for the purpose of illustration only and is not to be taken in a limitation. A variety of modifications or alterations will readily occur to one skilled in the automotive and associated arts. For example, while the illustrated embodiment represents an adaptation of the invention to an air suspension system having a closed pneumatic circuit, gases other than air might be used in such a closed circuit. In this case, the fact that the delivery and withdrawal of the gas into and out of the suspension units are so well balanced that the closed circuit needs hardly any replenishment or exhaust of the gas.

It is also understood that the present invention finds application to hydraulic or hydropneumatic suspension systems, too. The suspension units of such systems have hydraulic cylinders. Fundamentally, however, the hydraulic or hydropneumatic systems are the same as those of the air suspension system disclosed herein, except that an oil pump is employed in place of an air compressor. Hydraulic oil is forced into the cylinders from an accumulator, into which the oil has been pumped for storage under pressure, and is drained from the cylinders to a pump. The controller in accordance with this invention actuates a hydraulic control valve assembly comprising a delivery valve and an exhaust valve for the delivery and withdrawal of the fluid into and out of each hydraulic cylinder. The controller may control the valve assembly in a manner that the insensitivity zones are widened or narrowed with the vehicle speed.

A variety of additional modifications or adaptations of the invention may be contemplated within the broad teaching hereof as expressed in the following claims.

While the presently preferred embodiments of the present invention have been shown and described, it is to be understood that these disclosure are for the purpose of illustration and that various changes and modifications may be made without departing from the scope of the invention as set forth in the appended claims.

What is claimed is:

1. An active fluid suspension system for a motor vehicle having
    a set of fluid suspension units disposed at each wheel of the motor vehicle;
    fluid supply means for providing a fluid under pressure to said suspension unit;
    control valve means for controlling a delivery of pressurized fluid from the fluid supply means to the individual suspension units and a withdrawal of the fluid from the suspension units;
    acceleration sensor means for providing acceleration signals representing acceleration of upward and downward direction of the vehicle;
    a displacement sensor for detecting a displacement between a vehicle body and a wheel;

a vehicle speed sensor for providing an electric signal representing speed of the motor vehicle; which comprises control means connected between the sensor means and the control valve means for causing the latter to control the delivery and the withdrawal of the fluid to and from the suspension units in response to the output signals of the sensor means; and insensitivity zone filter means included in the control means for attenuating a portion of each output signal from the sensor means of which amplitude is in an insensitivity zone which is variable in dependency on the electric signal of the vehicle speed sensor for widening the insensitivity zones with an increase in vehicle speed.

2. The active fluid suspension system of claim 1 wherein the insensitivity zone filter means have a plurality of insensitivity zones of different width according to a speed range of the motor vehicle.

* * * * *